United States Patent
Cho et al.

(10) Patent No.: US 9,031,006 B2
(45) Date of Patent: May 12, 2015

(54) APPARATUS AND METHOD FOR USING GUARD BAND AS DATA SUBCARRIER IN COMMUNICATION SYSTEM SUPPORTING FREQUENCY OVERLAY

(75) Inventors: Jae-Hee Cho, Seoul (KR); Kwan-Hee Roh, Hwaseong-si (KR); Si-Hyun Park, Hwaseong-si (KR); Hee-Won Kang, Seongnam-si (KR); Jae-Weon Cho, Suwon-si (KR); Jeong-Ho Park, Seoul (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 1696 days.

(21) Appl. No.: 12/381,178

(22) Filed: Mar. 9, 2009

(65) Prior Publication Data

US 2009/0232071 A1 Sep. 17, 2009

(30) Foreign Application Priority Data

Mar. 13, 2008 (KR) .......................... 10-2008-0023534
Jun. 30, 2008 (KR) .......................... 10-2008-0062536

(51) Int. Cl.
*H04W 4/00* (2009.01)
*H04L 5/00* (2006.01)
*H04W 24/00* (2009.01)
*H04W 72/00* (2009.01)
(Continued)

(52) U.S. Cl.
CPC ............. *H04L 5/0044* (2013.01); *H04W 24/00* (2013.01); *H04W 72/00* (2013.01); *H04W 72/02* (2013.01); *H04W 72/04* (2013.01)

(58) Field of Classification Search
CPC .................................................... H04W 72/04

USPC .......... 370/329, 341, 431, 437; 455/210, 211, 455/256, 273
See application file for complete search history.

(56) References Cited

U.S. PATENT DOCUMENTS

| 7,598,815 | B2 * | 10/2009 | Chen et al. ....................... 331/16 |
| 7,852,907 | B2 * | 12/2010 | Eerola ............................. 375/150 |
| 2006/0291414 | A1 | 12/2006 | Lim et al. |

(Continued)

FOREIGN PATENT DOCUMENTS

| KR | 10-2007-0001019 A | 1/2007 |
| KR | 10-2007-0023965 A | 3/2007 |
| KR | 10-2008-0010465 | 1/2008 |

OTHER PUBLICATIONS

Notice of Preliminary Rejection dated Jun. 18, 2014 in connection with Korean Application No. 10-2008-0023534, 11 pages.

(Continued)

*Primary Examiner* — Derrick Ferris
*Assistant Examiner* — Abdelnabi Musa

(57) ABSTRACT

A method and apparatus for using a guard band as a data subcarrier in a communication system supporting frequency overlay are provided. In a method of operating mobile station for using a guard band as a subcarrier for signal transmission in a communication system supporting frequency overlay, the method includes searching for a first center frequency located at a position corresponding to an integer multiple of a subcarrier spacing, after searching for the first center frequency, receiving information indicating the numbers $n_1$ and $n_2$ of first additional subcarriers, and performing a first network entry process by using all subcarriers including the first additional subcarriers.

35 Claims, 10 Drawing Sheets

(51) Int. Cl.
*H04W 72/02* (2009.01)
*H04W 72/04* (2009.01)

(56) References Cited

U.S. PATENT DOCUMENTS

| | | | |
|---|---|---|---|
| 2007/0054681 A1 | 3/2007 | Suh et al. | |
| 2007/0230600 A1* | 10/2007 | Bertrand et al. | 375/260 |
| 2008/0070586 A1* | 3/2008 | Kermoal et al. | 455/452.2 |
| 2009/0220014 A1* | 9/2009 | Higuchi et al. | 375/260 |
| 2009/0225824 A1* | 9/2009 | Noh et al. | 375/240 |
| 2010/0329384 A1* | 12/2010 | Kwak et al. | 375/295 |
| 2011/0103406 A1* | 5/2011 | Cai et al. | 370/480 |
| 2011/0216844 A1 | 9/2011 | Higuchi et al. | |

OTHER PUBLICATIONS

Notice of Preliminary Rejection dated Jun. 20, 2014 in connection with Korean Application No. 10-2008-0062536, 13 pages.
Notice of Patent Grant dated Dec. 18, 2014 in connection with Korean Patent Application No. 10-2008-0023534; 7 pages.
Notice of Preliminary Rejection dated Dec. 26, 2014 in connection with Korean Patent Application No, 10-2008-0062536; 8 pages.
Roh, et al.; "Proposed 802.16m DL Control Channel Scheme to Use More Subcarriers in Guard Band"; IEEE C802.16m-08/208r1; Mar. 11, 2008; 3 pages.

* cited by examiner

APPARATUS AND METHOD FOR USING GUARD BAND AS DATA SUBCARRIER IN COMMUNICATION SYSTEM SUPPORTING FREQUENCY OVERLAY

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Mar. 13, 2008 and assigned Serial No. 10-2008-0023534 and a Korean patent application filed in the Korean Intellectual Property Office on Jun. 30, 2008 and assigned Serial No. 10-2008-0062536, the entire disclosure of which is hereby incorporated by reference.

TECHNICAL FIELD OF THE INVENTION

The present invention relates to a broadband wireless communication system supporting frequency overlay. More particularly, the present invention relates to an apparatus and method for using an unused guard band as a data subcarrier in order to reduce interference between frequency assignments.

BACKGROUND OF THE INVENTION

In general, a wireless communication system defines a guard band to avoid mutual interference between channels (or Frequency Assignments (FAs)). For example, in an Orthogonal Frequency Division Multiplexing (OFDM)-based system, the guard band is used so that a spectrum of an OFDM signal has a 'brick wall' pattern. In addition, by transmitting a '0' (i.e., no signal) on a plurality of left and right subcarriers, a signal component acting as interference to an adjacent frequency band is decreased after performing Fourier transform.

FIG. 1 illustrates a frequency domain in a conventional OFDM-based communication system.

Referring to FIG. 1, the OFDM-based communication system performs communication by using an FA that is a channel frequency assignment unit (i.e., bandwidths of 5 MHz, 10 MHz, and 20 MHz), and is assigned with multiple FAs 101 and 111. Each of the FAs 101 and 111 consists of a plurality of subcarriers 102 and 112. An $f_{c1}$ 101 is a center frequency of the FA 101. An $f_{c2}$ 110 is a center frequency of the FA 111. A guard band 130 is provided to avoid interference between the FA 101 and the FA 111.

Meanwhile, a standard or the like is being revised so that a communication system is evolved to provide a high-speed data service in comparison with a legacy system or to address an implementation issue. In such a system evolution process, various systems can coexist in the same area according to compatibility the legacy system. For example, a new system that uses an FA of 20 MHz and is further evolved from the legacy system using an FA of 10 MHz, may be deployed in an area where an OFDM-based wideband wireless communication system is installed. The legacy system supports only a Mobile Station (MS) that has a single bandwidth in single FA. That is, the legacy system using the FA of 10 MHz has a structure that can support only an MS using an FA of 10 MHz. Therefore, in order to support a new MS having a greater bandwidth, such as an MS using an FA of 20 MHz, a new FA having a bandwidth of 20 MHz is necessary.

Accordingly, researches on a frequency overlay technique, which uses conventional multiple FAs without assigning a new frequency band, are being introduced. In the frequency overlay technique, the conventionally used multiple FAs are simultaneously used to support a required new FA. For example, in a state where two FAs of 10 MHz are previously used, a service using an FA of 20 MHz can be provided without additional frequency assignment when the two FAs of 10 MHz are subjected to a frequency overlay operation. A guard band defined to avoid interference between two FAs of 10 MHz may be used as a data region in the frequency overlay operation in order to increase bandwidth efficiency.

In this case, as shown in FIG. 1, a spacing between the center frequencies, i.e., the $f_{c1}$ 100 and the $f_{c2}$ 110, of the two adjacent FAs 101 and 111 may not be an integer multiple of a subcarrier spacing. For example, in the Institute of Electrical and Electronics Engineers (IEEE) 802.16e standard, if an FA of 10 MHz is used, a sampling frequency is 11.2 MHz and a subcarrier spacing is 10.9375 kHz. When the spacing between the two adjacent FAs is 10 MHz, it is not an integer multiple of the subcarrier spacing, and thus, disparity occurs in a raster between the adjacent FAs. In such a case, the guard band 130 is required since mutual interference occurs when using a subcarrier included in the guard band 130 located between the two FAs. Accordingly, since the guard band cannot be used in the frequency overlay operation, there is a disadvantage in that spectral efficiency decreases.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide an apparatus and method for using a guard band located between two adjacent FAs as a data subcarrier in a communication system supporting frequency overlay.

In accordance with an aspect of the present invention, a method of operating a MS for using a guard band as a subcarrier for signal transmission in a communication system supporting frequency overlay is provided. The method includes searching for a first center frequency located at a position corresponding to an integer multiple of a subcarrier spacing, after searching for the first center frequency, receiving information indicating the numbers $n_1$ and $n_2$ of first additional subcarriers, and performing a first network entry process by using all subcarriers including the first additional subcarriers.

In accordance with another aspect of the present invention, a method of operating a Base Station (BS) for using a guard band as a subcarrier for signal transmission in a communication system supporting frequency overlay is provided. The method includes broadcasting information indicating the numbers $n_1$ and $n_2$ of first additional subcarriers according to a first center frequency located at a position corresponding to an integer multiple of a subcarrier spacing, performing a first network entry process with a corresponding MS by using all subcarriers including the first additional subcarriers, after the first network entry process, broadcasting information indicating the numbers $n_1$ and $n_2$ of second additional subcarriers according to a second center frequency located at a position corresponding to an integer multiple of the subcarrier spacing in a frequency overlay mode, and performing a second network entry process with the corresponding MS by using all subcarriers including the second additional subcarriers.

In accordance with another aspect of the present invention, an apparatus for using a guard band as a subcarrier for signal transmission in a communication system supporting frequency overlay is provided. The apparatus includes a first Media Access Control (MAC) processor for searching for a first center frequency located at a position corresponding to an integer multiple of a subcarrier spacing, and after searching for the first center frequency, for receiving information indicating the numbers $n_1$ and $n_2$ of first additional subcarriers, and a controller for performing a first network entry process by using all subcarriers including the first additional subcarriers.

In accordance with another aspect of the present invention, an apparatus for using a guard band as a subcarrier for signal transmission in a communication system supporting frequency overlay is provided. The apparatus includes a MAC process for broadcasting information indicating the numbers $n_1$ and $n_2$ of additional subcarriers according to a first center frequency located at a position corresponding to an integer multiple of a subcarrier spacing, and a controller for performing a network entry process with a corresponding MS by using all subcarriers including the additional subcarriers.

In accordance with another aspect of the present invention, a method of operating an MS for using a guard band as a subcarrier for signal transmission in a communication system supporting frequency overlay is provided. The method includes searching for a first center frequency by compensating for the first center frequency shifted to be an integer multiple of a subcarrier spacing, after searching for the first center frequency, receiving information indicating the numbers $n_1$ and $n_2$ of first additional subcarriers in a resource block unit, and performing a first network entry process by using all subcarriers including the first additional subcarriers, wherein a total sum (i.e., $n_1+n_2$) of the first additional subcarriers is an integer multiple of a resource block size.

In accordance with another aspect of the present invention, a method of operating a BS for using a guard band as a subcarrier for signal transmission in a communication system supporting frequency overlay is provided. The method includes shifting a first center frequency to be equal to an integer multiple of a subcarrier spacing, broadcasting information regarding first additional subcarriers according to the shifted first center frequency, and performing a first network entry process with a corresponding MS by using all subcarriers including the first additional subcarriers.

In accordance with another aspect of the present invention, an apparatus for using a guard band as a subcarrier for signal transmission in a communication system supporting frequency overlay is provided. The apparatus includes a first MAC processor for searching for a first center frequency by compensating for the first center frequency shifted to be an integer multiple of a subcarrier spacing, and after searching for the first center frequency, for receiving information indicating the numbers $n_1$ and $n_2$ of first additional subcarriers in a resource block unit, and a controller for performing a first network entry process by using all subcarriers including the first additional subcarriers, wherein a total sum (i.e., $n_1+n_2$) of the first additional subcarriers is an integer multiple of a resource block size.

In accordance with another aspect of the present invention, an apparatus for using a guard band as a subcarrier for signal transmission in a communication system supporting frequency overlay is provided. The apparatus includes a first MAC processor for shifting a first center frequency to be equal to an integer multiple of a subcarrier spacing and for broadcasting information regarding first additional subcarriers according to the shifted first center frequency and a controller for performing a first network entry process with a corresponding MS by using all subcarriers including the first additional subcarriers.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF EXEMPLARY EMBODIMENTS

FIGS. 2 through 9B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The present invention to be described hereinafter is related to an apparatus and method for using a guard band as a data subcarrier by setting a spacing between respective center frequencies of adjacent FAs to an integer multiple of a subcarrier spacing in a broadband wireless communication system supporting frequency overlay. By assigning the FAs so that the spacing between the respective center frequencies is an integer multiple of the subcarrier spacing, a guard band between the two FAs is equal to an integral multiple of the subcarrier spacing.

Each FA may be fixed such that the spacing between the respective center frequencies of the FAs is equal to an integer multiple of the subcarrier spacing. Alternatively, the center frequencies of the adjacent FAs may be flexibly calculated such that the spacing between a center frequency of any reference FA and a center frequency of its adjacent FA is equal to an integer multiple of the subcarrier spacing.

Figure 1:
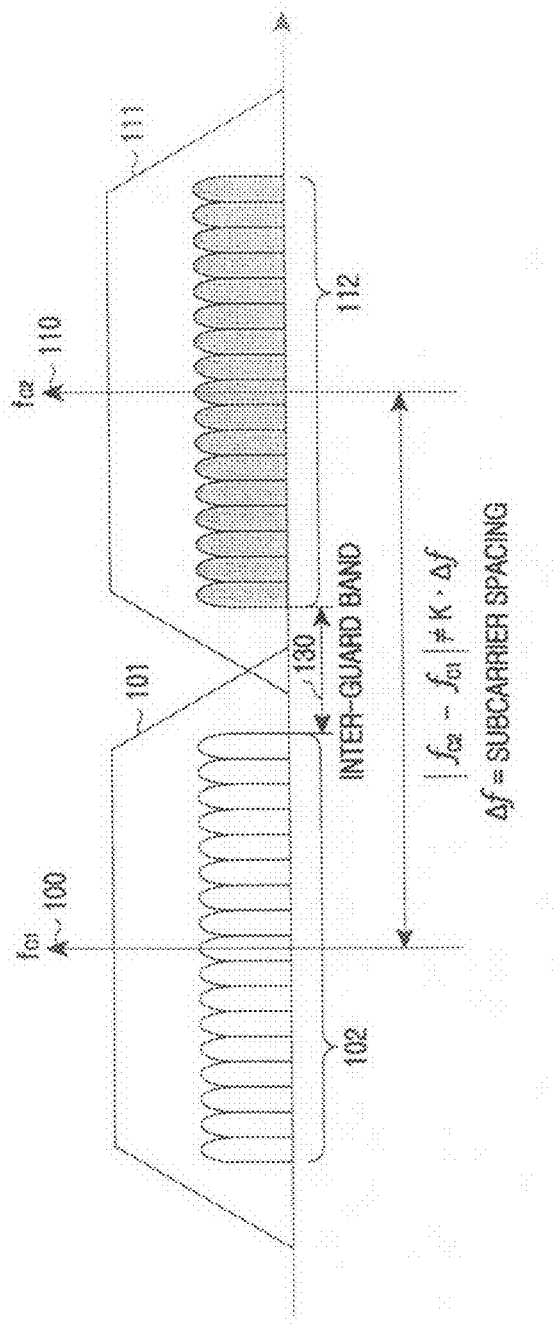
FIG. 1 illustrates a frequency domain in a conventional OFDM-based communication system.
Figure 2:
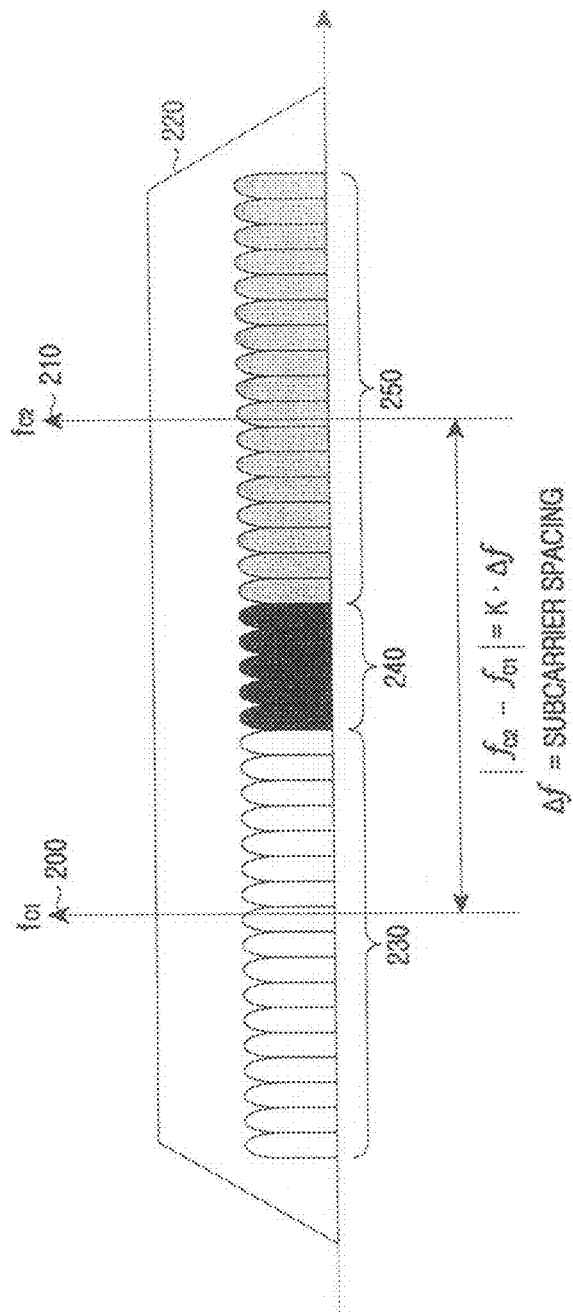
FIG. 2 illustrates an example of using a guard band between FAs as a data subcarrier according to an exemplary embodiment of the present invention.

FIG. 2 illustrates an example of using a guard band between FAs as a data subcarrier according to an exemplary embodiment of the present invention.

Referring to FIG. 2, two FAs having center frequencies $f_{c1}$ 200 and $f_{c2}$ 210 are used to provide services simultaneously to a MS supporting frequency overlay. That is, a first FA having the center frequency of the $f_{c1}$ 200 and a second FA having the center frequency of the $f_{c2}$ 210 respectively include subcarriers 230 and 250, and the MS receives the services by using a single FA or multiple FAs. For example, when the MS receives a service by using an FA of 10 MHz, another FA of 10 MHz may be added so that the MS can receive the service by using an FA of 20 MHz (as indicated by 220 in FIG. 2).

In this case, when spacing between center frequencies between adjacent FAs is set to be an integer multiple of a subcarrier spacing, subcarriers 240 of the respective FAs can maintain orthogonality with each other. Thus, mutual interference can be avoided even if a subcarrier included in a guard band is used. Accordingly, the subcarrier of the guard band can be used as a data subcarrier.

Figure 3:
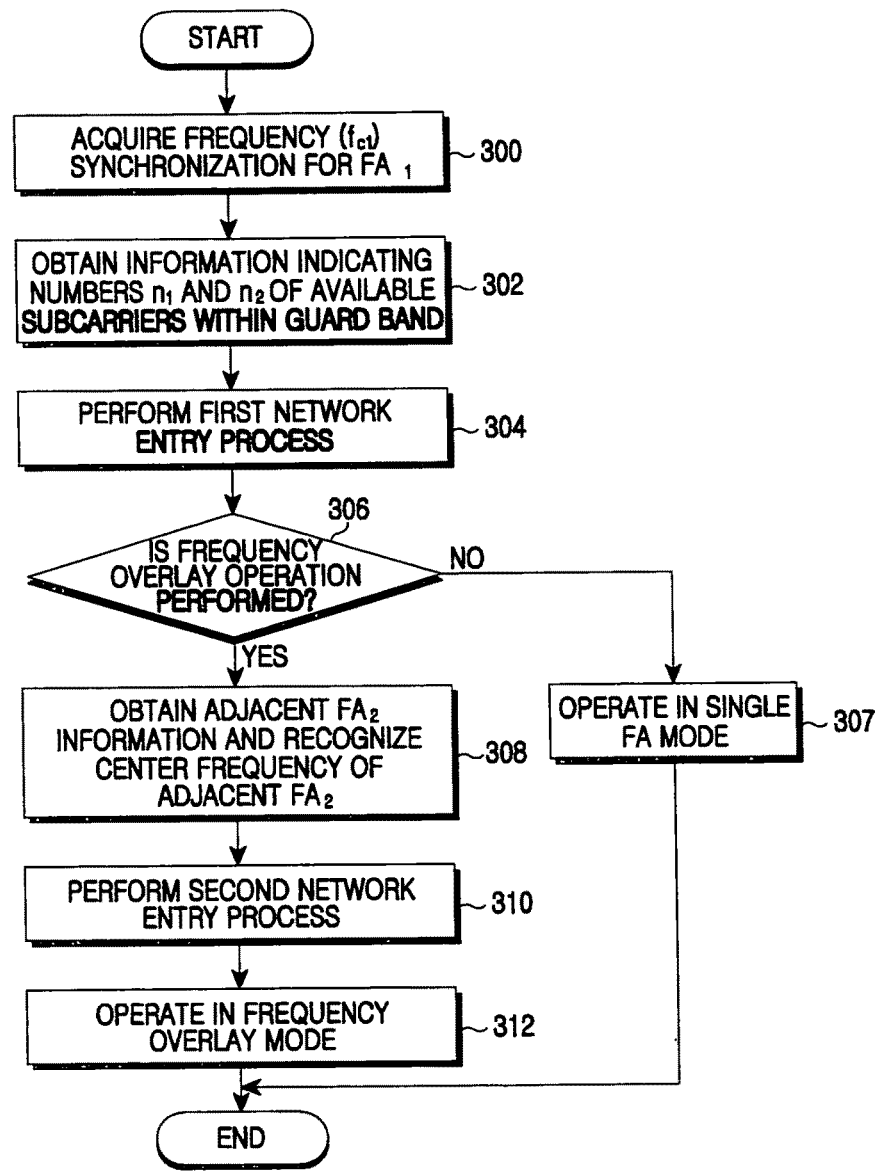
FIG. 3 is a flowchart illustrating an operation of a MS for using a guard band as a data subcarrier in a broadband wireless communication system supporting frequency overlay according to an exemplary embodiment of the present invention.

FIG. 3 is a flowchart illustrating an operation of an MS for using a guard band as a data subcarrier in a broadband wireless communication system supporting frequency overlay according to an exemplary embodiment of the present invention.

For convenience of explanation, it is assumed that an FA size of a BS is set to 5 MHz (using a 512-FFT size), and frequency overlay may be supported in other units (e.g., 10 MHz or 20 MHz) other than 5 MHz. In a system supporting frequency overlay, information indicating whether a preamble for initial synchronization and a control channel (e.g., MAP information, a Frame Control Header (FCH), etc.) for transmitting broadcast information are transmitted or not can be transmitted optionally by using a specific FA or by using multiple FAs. When the preamble and the control channel are transmitted using the multiple FAs, an MS can perform an initial access process in any FA and thus a processing time of the initial access process can be reduced. It is assumed herein that the preamble and the control channel are transmitted using the multiples FAs.

Referring to FIG. 3, in step 300, the MS scans all possible frequency positions within a specific range to acquire frequency synchronization for a first FA. In this case, the MS can detect a center frequency of the first FA through frequency synchronization.

Since all frequency positions are scanned, an excessive time may be consumed in an initial synchronization acquisition process. Therefore, a current IEEE 802.16e system has a restriction in that a center frequency position must be an integer multiple of 250 kHz in Downlink (DL) and Uplink (UL). In this case, the MS performs a scanning process in a unit of 250 kHz within a specific range, and thus an overhead of the initial frequency synchronization acquisition process can be reduced.

A Cyclic Prefix (CP) length of a preamble used for a synchronization channel can vary according to a decision made by the BS. In this case, the MS can consider not only a center frequency and a channel bandwidth but also a combination of CP lengths. Alternatively, to reduce the overhead of the initial frequency synchronization acquisition process of the MS, the BS may fix the CP length. It is assumed that the MS attempting initial access to a system knows in advance a value $N_{Base}$ which denotes the number of data subcarriers used in a preamble.

In step 302, the MS obtains broadcast information indicating the numbers $n_1$ and $n_2$ of available subcarriers within a guard band.

After acquiring initial frequency synchronization through the preamble search process, the MS recognizes the number of subcarriers to be used as a data subcarrier in a data region through a broadcast channel (e.g., MAP information, FCH, Broadcast CHannel (BCH), etc.). The MS which has to initially receive the broadcast channel still may not know the number of data subcarriers. Thus, the broadcast channel uses $N_{Base}$ data subcarriers similarly to the preamble. In a frame structure of FIG. 5, a preamble 500 and a broadcast channel 502 use $N_{Base}$ data subcarriers 508. Upon receiving the broadcast channel, the MS recognizes the numbers $n_1$ and $n_2$ of subcarriers 504 to be used as a data subcarrier within a guard band in addition to the $N_{Base}$ subcarriers 508 in the data region. Therefore, data transmission can be performed by using $N_{Total}$ subcarriers 510 for the data burst region 506 of a frame.

In general, a guard band size required in each FA may differ according to presence or absence of other systems in an adjacent frequency band, an out-of-band emission regulation determined by a system, a Transmit (Tx)/Receive (Rx) filter design requirement, etc. Thus, the numbers $n_1$ and $n_2$ of subcarriers that can be additionally used may differ in a left guard band and a right guard band of each FA. In this case, a broadcast channel may directly announce the numbers $n_1$ and $n_2$ of subcarriers 504 to be additionally used within a guard band, or may announce only either $n_1$ or $n_2$ together with a sum of $n_1$ and $n_2$. When $n_1$ is equal to $n_2$, only a value n (where $n=n_1=n_2$) may be announced.

In another embodiment, $n=n_1$, $n_2=0$ or $n=n_2$, $n_1=0$. In this case, the BS may announce the value n (i.e., the number of subcarriers to be used in the guard band) and information indicating to which guard band a corresponding subcarrier will be used. The information may be 'left', 'right', or 'both'. If the information is 'left' or 'right', the number of subcarriers to be additionally used is n. Otherwise, if the information is 'both', the number of subcarriers to be additionally used is 2n in both sides.

Figure 6A:
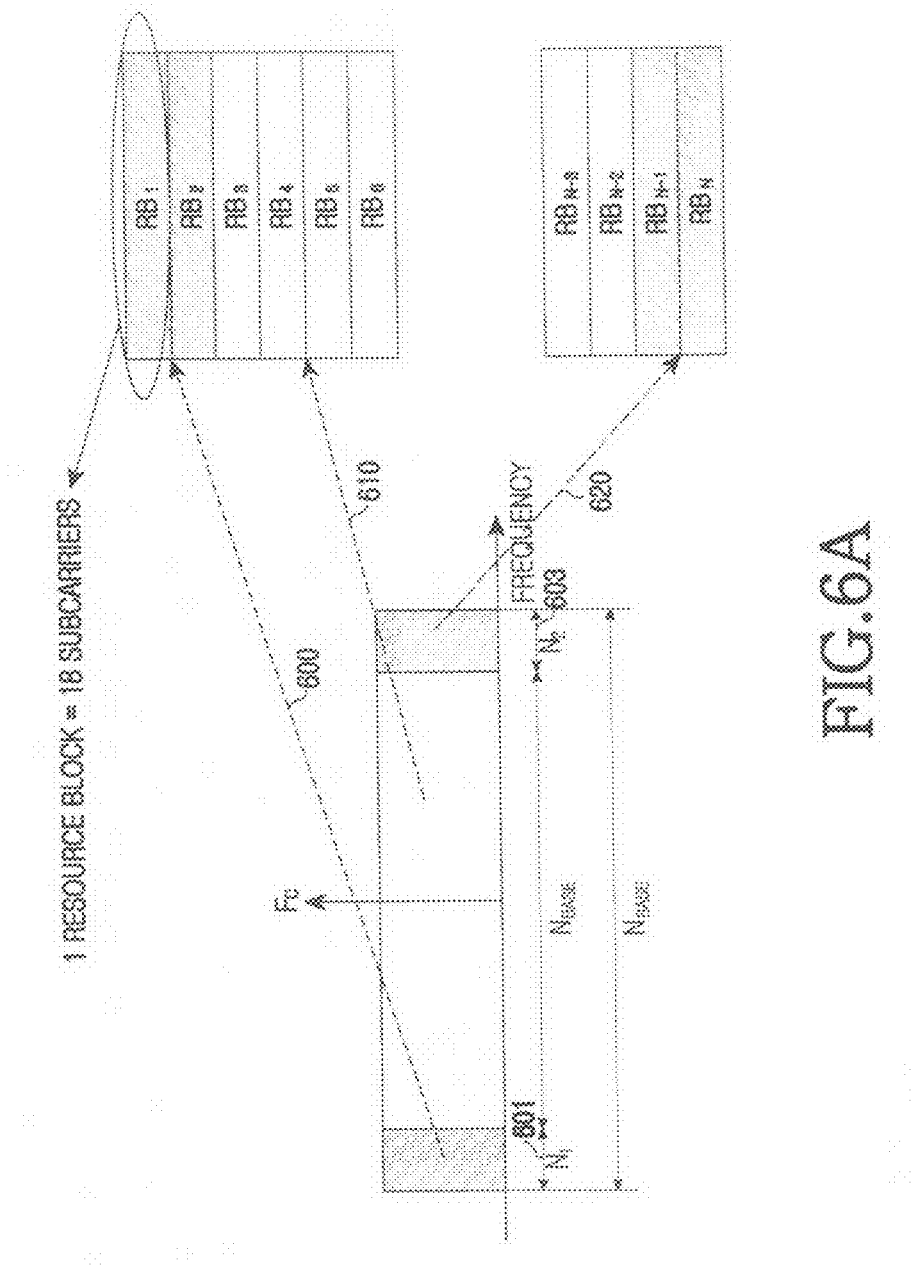
FIGS. 6A and 6B illustrate structures of a subchannel to be used in a data region according to an exemplary embodiment of the present invention.
Figure 6B:
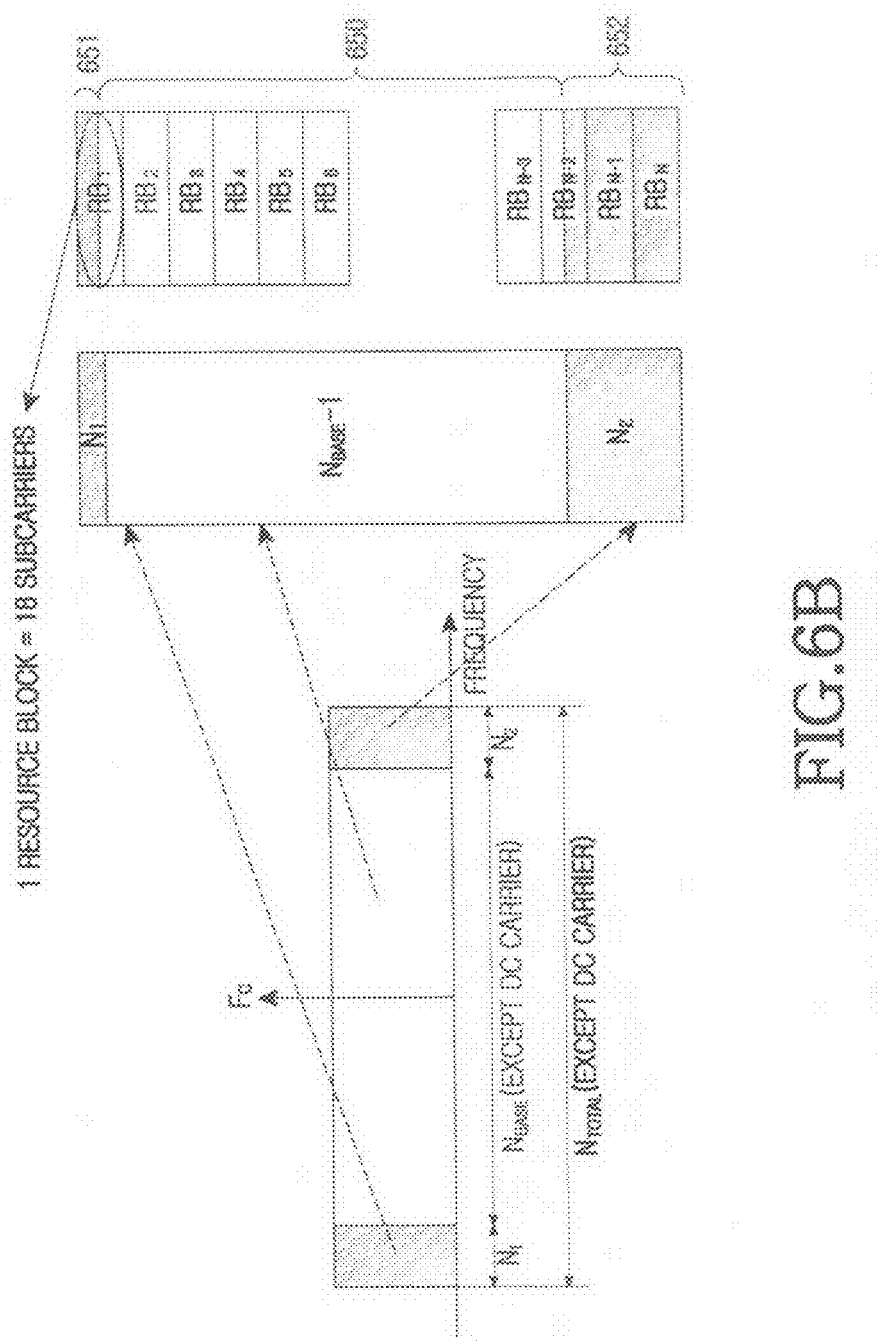

Meanwhile, when subchannelization is achieved such that a subchannel to be used in a data region shown in FIGS. 6A and 6B are configured in a specific resource block unit, it is more effective to determine the sum of $n_1$ (601) and $n_2$ (603) in a unit of a resource block size for subchannelization (600, 610, 620). For example, if the resource block size corresponds to eighteen (18) subcarriers, $n_1+n_2=18*n$, and the broadcast channel transmits only the value n. In this case, an overhead can be reduced in comparison with the case of directly announcing both $n_1$ and $n_2$. If each of $n_1$ and $n_2$ corresponds to a multiple of 18 that is a resource block size, permutation is performed using resource blocks having a format of FIG. 6A. If each of $n_1$ and $n_2$ is not a multiple of eighteen (18) but the sum of $n_1$ and $n_2$ is a multiple of (18), as shown in FIG. 6B, a specific resource block may include additional subcarriers of a guard band and conventional $N_{Base}$ subcarriers 651 and 652.

A service provider can properly regulate the values $n_1$ and $n_2$ by considering a bandwidth assigned to the service provider, frequency spacing between the service provider and a neighboring service provider, a spectral mask requirement, etc.

In step 304, the MS performs a first network entry process on the first FA with the BS.

After recognizing $N_{Total}$ (i.e., the total number of available subcarriers) through the broadcast channel, the MS can receive data and DL control information transmitted at the first FA. Thereafter, the MS performs an initial network entry process similarly to the conventional IEEE 802.16e system. The MS to which a service is additionally provided in a frequency overlay mode exchanges additional information required in an overlay operation through a capability negotiation process. The BS announces information regarding a supportable adjacent FA to the MS to be operated in the frequency overlay mode. The MS is subjected to a simple network entry process, if necessary, for the adjacent FA by using corresponding information, and thereafter operates in the frequency overlay mode.

In step 306, the MS determines whether a frequency overlay operation is performed. If the frequency overlay operation is performed, proceeding to step 308, the MS obtains information regarding available subcarriers within a guard band for a second FA. In step 310, the MS performs a second network entry process on the second FA. In step 312, the MS operates in the frequency overlay mode in which two FAs (i.e., $FA_1$ and $FA_2$) are used.

If the frequency overlay operation is not performed, proceeding to step 307, the MS operates in a single FA mode in which one FA (i.e., $FA_1$) is used.

When the frequency overlay operation is performed, if necessary, the BS can specify a specific FA as a primary FA among FAs assigned for the frequency overlay. The primary FA corresponds to an FA for transmitting a connection management message or the like to be exchanged between the BS and the MS. In this case, the MS can reduce an overhead in which multiple FAs have to be entirely received unnecessarily all the time to receive a management message.

In addition, a traffic burst transmitted to the MS of a user in the frequency overlay mode may be transmitted only with a specific FA or may be transmitted by being overlaid in multiple FAs. The MS configures a subchannel to fit the number of subcarriers used as a data subcarrier in each FA, and thus receives a MAP and a data burst.

Thereafter, the procedure of FIG. 3 ends.

Figure 4:
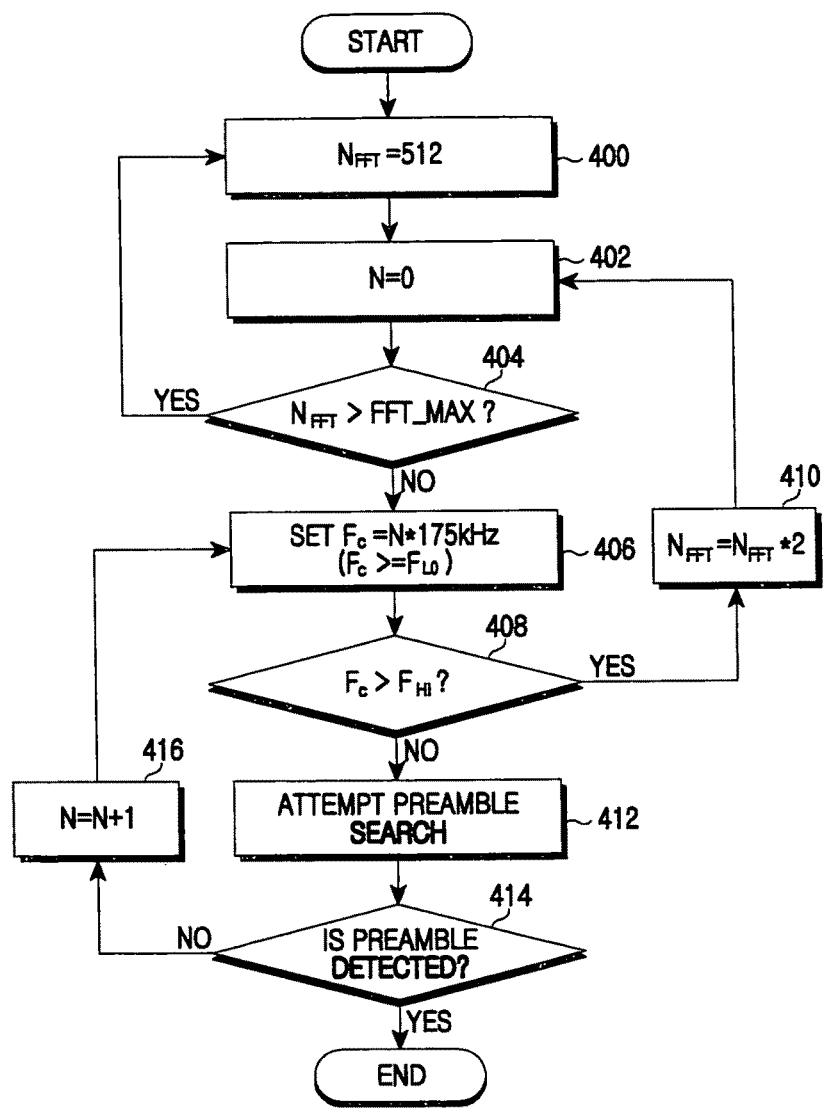
FIG. 4 is a flowchart illustrating a process of obtaining a center frequency of a BS and information regarding a channel bandwidth in use.
Figure 5:
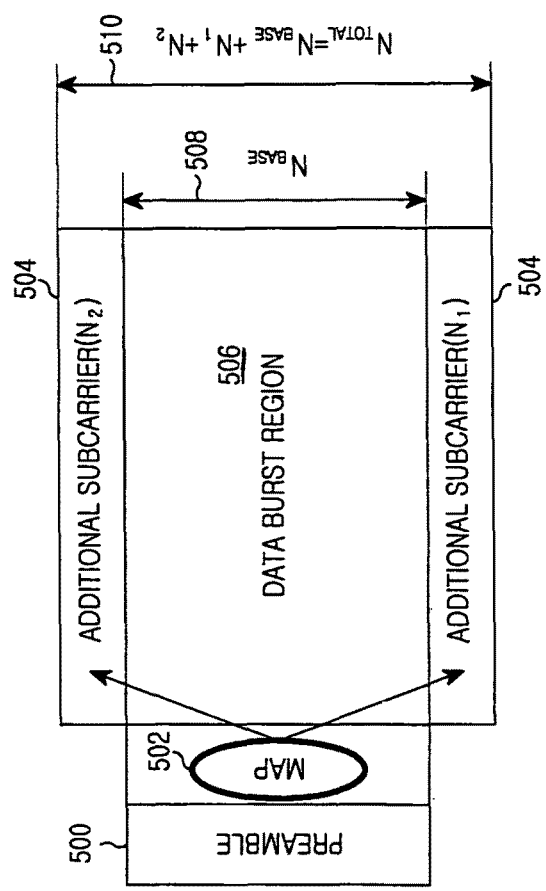
FIG. 5 illustrates a frame structure according to an exemplary embodiment of the present invention.

FIG. 4 is a flowchart illustrating a process of obtaining a center frequency of a BS and information regarding a channel bandwidth in use.

Referring to FIG. 4, in step 400, an MS attempting initial access performs an initial frequency acquisition process according to a 512-FFT size corresponding to a minimum channel bandwidth of a system. In step 402, a value n for scanning subcarrier spacing is set to '0'.

In step 404, if an FFT size (i.e., $N_{FFT}$) is greater than a maximum FFT size (i.e., FFT_MAX), the procedure returns to step 400, and otherwise, if the FFT size is less than or equal to the maximum FFT size, proceeding to step 406, the MS sets a center frequency to $F_c = n*175$ KHz, where $F_c$ denotes a center frequency of a preamble to be searched for, and n denotes a value for scanning the subcarrier spacing.

In step 408, if $F_c$ is greater than $F_{HI}$, proceeding to step 410, the MS sets an FFT size to $N_{FFT} = (N_{FFT})*2$. Thereafter, steps 402 to 406 are performed according to the modified $N_{FFT}$ size.

Otherwise, if $F_c$ is less than or equal to $F_{HI}$, proceeding to step 412, the MS searches for a preamble for the center frequency $F_c$.

In step 414, if the preamble is detected, the synchronization process ends, and otherwise, if the preamble is not detected, the MS sets the value n to n=n+1 in step 416. Then, the procedure returns to step 406.

In summary, under the assumption that the MS knows possible position information (i.e., $F_{LO}$ and $F_{HI}$) of a center frequency, the MS attempts a preamble search process from a position corresponding to an integer multiple of 175 kHz (changeable according to implementations) which is greater than or equal to $F_{LO}$. If the preamble is not found within a given range ($F_{LO} \sim F_{HI}$), the FFT size is doubled and the above steps are repeated. If the preamble is successfully found within the given range, the MS finishes the initial frequency synchronization acquisition process, and attempts initial network entry by using an FA currently served in a corresponding frequency band.

Figure 7:
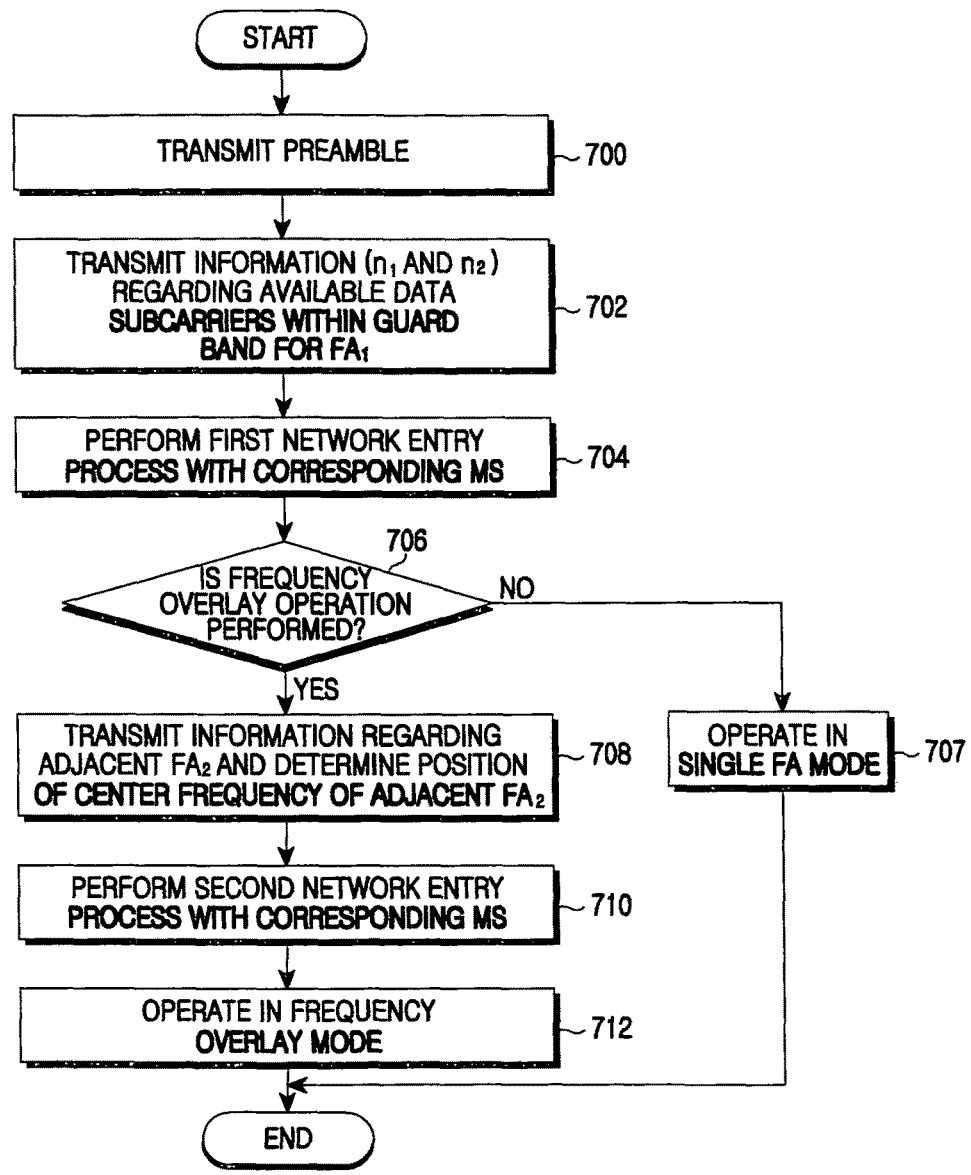
FIG. 7 is a flowchart illustrating an operation of a BS for using a guard band as a data subcarrier in a communication system supporting frequency overlay according to an exemplary embodiment of the present invention.

FIG. 7 is a flowchart illustrating an operation of a BS for using a guard band as a data subcarrier in a communication system supporting frequency overlay according to an exemplary embodiment of the present invention.

Referring to FIG. 7, the BS transmits a preamble for synchronization detection in step 700, transmits information regarding available data subcarriers within a guard band for a first FA to an MS in step 702, and performs a first network entry process with the MS by using all subcarriers including additional subcarriers in step 704.

In step 706, the BS determines whether a frequency overlay operation is performed. If the frequency overlay operation is performed, proceeding to step 708, the BS transmits information regarding an $FA_2$ adjacent to an $FA_1$ to the MS, and thereafter recognizes a center frequency of the adjacent $FA_2$ (see FIGS. 9A and 9B). In step 710, the BS performs a second network entry process by using the second FA (i.e., $FA_2$). In step 712, the BS operates in a frequency overlay mode in which two FAs (i.e., $FA_1$ and $FA_2$) are used.

If the frequency overlay operation is not performed, proceeding to step 707, the MS operates in a single FA mode in which one FA (i.e., $FA_1$) is used.

When the first network entry process is performed, whether the frequency overlay operation is performed or not is determined through a capability negotiation process.

Thereafter, the procedure of FIG. 7 ends.

According to implementations, when the frequency overlay operation is performed, information indicating the numbers $n_1$ and $n_2$ of additional subcarriers may be recognized by considering a guard band between the two FAs. In the present invention, the additional subcarriers are considered for each FA.

Figure 8:
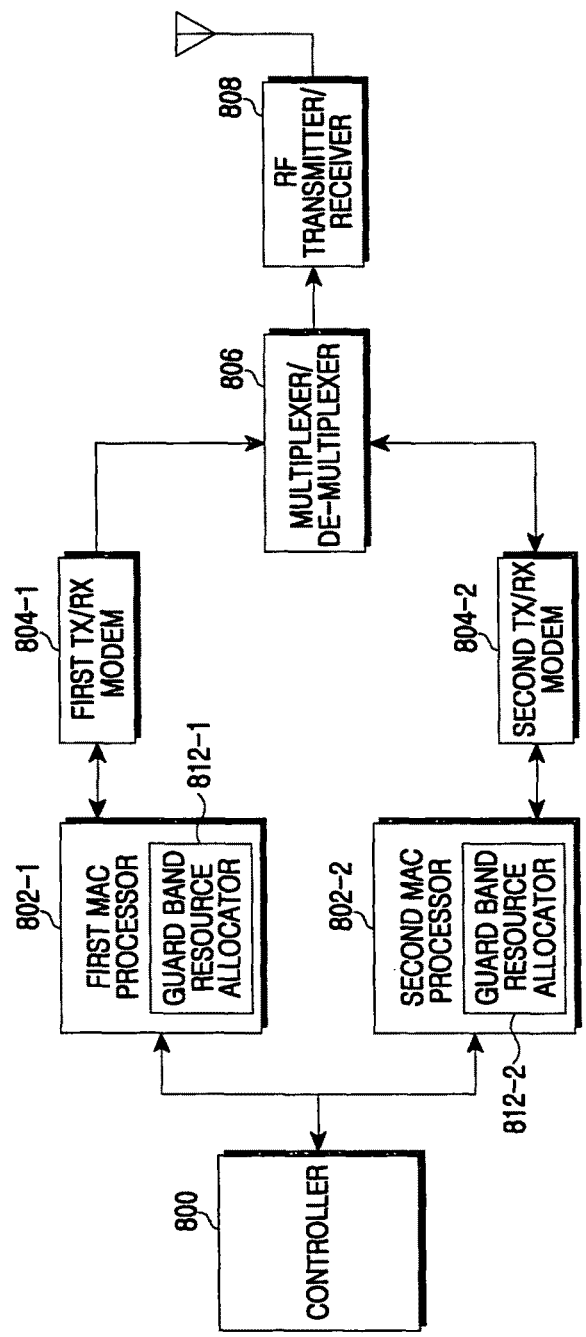
FIG. 8 is a block diagram illustrating an MS or a BS for using a guard band as a data subcarrier in a frequency overlay operation according to an exemplary embodiment of the present invention.

FIG. 8 is a block diagram illustrating an MS or a BS for using a guard band as a data subcarrier in a frequency overlay operation according to an exemplary embodiment of the present invention.

Referring to FIG. 8, the BS or the MS includes a controller 800, a first MAC processor 802-1, a second MAC processor 802-2, a first Tx/Rx modem 804-1, a second Tx/Rx modem 804-2, a multiplexer/de-multiplexer 806, and a Radio Frequency (RF) transmitter/receiver 808.

In a transmission operation, the controller 800 provides overall controls to the MS or the BS. That is, in case of the MS, the controller 800 acquires frequency synchronization for an FA and then performs a network entry process. Further, the controller 800 controls the frequency overlay operation so that a data burst is transmitted and received through multiple FAs. In case of the BS, the controller 800 transmits a broadcast channel, which includes a preamble and additional subcarrier information, and performs a network entry process with a corresponding MS.

The first MAC processor 802-1 performs MAC-layer processing on data transmitted from an upper layer (e.g., Internet Protocol (IP) layer) and delivers the resultant data to the first Tx modem 804-1. Further, the first MAC processor 802-1 performs a function for generating and analyzing a control message required in signaling. For example, the first MAC processor 802-1 generates a MAP message for additional subcarrier information of the controller 800.

The first Tx modem 804-1 performs physical-layer encoding on data (i.e., burst data) provided from the first MAC processor 802-1 according to the additional subcarrier information of the controller 800. For example, the first Tx modem 804-1 includes a channel condign block, a modulation block, etc., and modulates a signal provided from the first MAC processor 802-1 into a baseband signal. The channel coding block may consist of a channel encoder, an interleaver, a modulator, etc., and the modulation block may consist of an Inverse Fast Fourier Transform (IFFT) operator for carrying Tx data on a plurality of orthogonal subcarriers.

The first MAC processor 802-1 and the first Tx modem 804-1 are elements for performing communication by using a first FA, and operate under the control of the controller 800.

The second MAC processor 802-2 and the second Tx modem 804-2 are elements for performing communication by using a second FA, and operate under the control of the controller 800.

The multiplexer 806 multiplexes a first FA signal provided from the first Tx modem 804-1 and a second FA signal provided form the second Tx modem 804-2. The multiplexer 806 can perform multiplexing on signals having different frame structures by using time division multiplexing or frequency division multiplexing. The multiplexer 806 selects a signal provided from the first Tx modem 804-1 and provides the selected signal to the RF transmitter 808 during a service period of the first FA under the control of the controller 800. Further, the multiplexer 806 selects a signal provided from the second Tx modem 804-2 and provides the selected signal to the RF transmitter 808 during a service period of the second FA. For another example, if frequency division multiplexing is used, the multiplexer 806 may convert a baseband signal provided from the first Tx modem 804-1 into a signal of a first center frequency band, and convert a baseband signal provided from the second Tx modem 804-2 into a signal of a second center frequency band. Then, the multiplexer 806 combines the two converted signals to achieve frequency division multiplexing.

The RF transmitter 808 converts a signal provided from the multiplexer 806 into an RF signal that can be actually transmitted, and transmits the RF signal through an antenna. Physical-layer encoding performed by the first Tx modem 804-1 is similar to that performed by the second Tx modem 804-2. Thus, the first Tx modem 804-1 and the second Tx modem 804-2 may be implemented into one element in practice.

In a reception operation, the RF receiver 808 converts a signal received through an antenna into a baseband signal.

Under the control of the controller 800, the demultiplexer 806 may concurrently deliver signals, received from the RF receiver 808, to the first Rx modem 804-1 and the second Rx modem 804-2 or may output the signals by selecting any one the first Rx modem 804-1 and the second Rx modem 804-2.

The first Rx modem 804-1 performs physical-layer decoding on a signal received from the demultiplexer 806 according to a MAP received in a front portion of a frame. The first Rx modem 804-1 may include a modulation block, a channel decoding block, etc. If an OFDMA system is assumed, the modulation block may consist of a Fast Fourier Transform (FFT) operator or the like for extracting data carried on each subcarrier, and the channel decoding block may consist of a demodulator, a de-interleaver, a channel decoder, etc.

The first MAC processor 802-1 performs MAC-layer processing on data provided from the first Rx modem 804-1, and delivers the resultant data to an upper layer. Further, the first MAC processor 802-1 performs a function for generating and analyzing a control message required in signaling. For example, the first MAC processor 802-1 analyzes a first FA MAP message received from the BS and provides the analyzed MAP message to the controller 800.

The first Rx modem 804-1 and the first MAC processor 802-1 are elements for performing communication by using a first FA, and operate under the control of the controller 800.

The second Rx modem 804-2 and the second MAC processor 802-2 are elements for performing communication by using a second FA, and operate under the control of the controller 800.

The MAC processor 802 acquires frequency synchronization for the first FA, and finds a center frequency that is an integer multiple of a subcarrier spacing.

After acquiring the frequency synchronization, the controller 800 receives information regarding a first additional radio resource, and performs a first network entry process by using all radio resources including the first additional radio resource. The first additional radio resource is a part of subcarriers included in a guard band at both sides of the first FA. The guard band corresponds to a multiple integer of the subcarrier spacing.

During the first network entry process, the controller 800 negotiates whether the frequency overlay operation is performed. When the frequency overlay operation is performed, the controller 800 acquires frequency synchronization for the second FA, receives information regarding the second additional radio resource, and performs a second network entry process by using all radio resources including the second additional radio resource. The second additional radio resource is a part of subcarriers included in a guard band at both sides of the second FA. The controller 800 searches for a preamble within a determined range from a position corresponding to an N-integer multiple of the subcarrier. If the preamble is not found, the controller 800 re-searches for the preamble by doubling an FFT size.

Information regarding the first additional radio resource includes information indicating the numbers $n_1$ and $n_2$ of subcarriers of both sides of the first FA or information indicating only $n_1$ (or $n_2$). When a channel is constructed such that specific subcarriers are configured in one resource block unit, information indicating the numbers $n_1$ and $n_2$ of the additional subcarriers is provided in the resource block size. If a sum of the numbers $n_1$ and $n_2$ of the additional subcarriers is not an integer multiple of the resource block size, some of conventional subcarriers other than the subcarriers included in the guard band are included so that the sum is a multiple of the resource block size.

In an operation of a BS/MS for using a subcarrier of a guard band, the MS recognizes the number of subcarriers used as a data subcarrier included in the guard band through an initial system access process in a system supporting frequency overlay, and thereafter receives a service by using the data subcarrier.

The MS operates as follows. After acquiring frequency synchronization, the MS receives information required to system access through a broadcast channel. The received information includes information regarding the number of data subcarriers to be used in a data symbol. Since the number of data subcarriers in a symbol including the broadcast channel has to be known in advance to the MS, a subcarrier of a guard band is not used in that symbol. Upon recognizing the number of data subcarriers used in the remaining data regions other than a preamble and a broadcast channel that are used for initial synchronization acquisition and broadcast channel delivery, the MS can perform subchannelization by using the recognized number. Thereafter, the MS performs an initial network access process with the BS according to the result of subchannelization. In the initial network access process, whether the MS operates in the frequency overlay mode is determined through a capability negotiation process, and according to the determination result, the BS delivers information regarding an adjacent FA to the MS. When in the frequency overlay mode, the MS can perform an additional initial network access process on the adjacent FA, if necessary. After completing this process, the MS can receive a service by using assigned multiple FAs, thereby initiating the operation of the frequency overlay mode.

A method of setting a spacing between center frequencies of adjacent FAs to an integer multiple of a subcarrier spacing will be described by taking two simple examples with reference to FIGS. 9A and 9B.

Figure 9A:
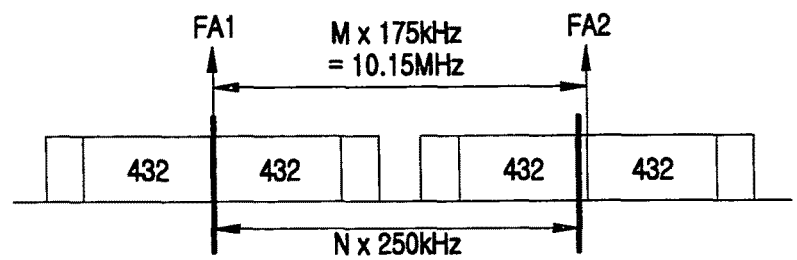
FIGS. 9A and 9B illustrate examples of setting a center frequency spacing to an integer multiple of a subcarrier spacing according to an exemplary embodiment of the present invention.
Figure 9B:
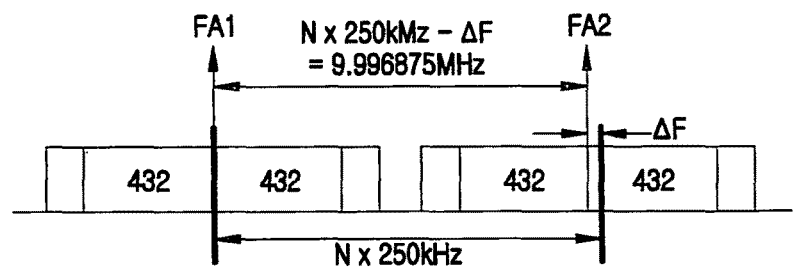

FIGS. 9A and 9B illustrate an examples of setting a center frequency spacing to an integer multiple of a subcarrier spacing according to an exemplary embodiment of the present invention.

Referring to FIG. 9A, a size of a frequency raster is set to an integer multiple of a subcarrier spacing. A position of the center frequency corresponds to an integer multiple of the subcarrier spacing. If a sample frequency is 11.2 MHz, the subcarrier spacing corresponds to 10.9375 kHz. The narrower the spacing between positions of the center frequencies, the greater the number of cases where an MS has to perform scanning in an initial frequency acquisition process. In contrast, the wider the spacing, the lower the degree of freedom with which a service provider can regulate a center frequency position within a band assigned to the service provided. Therefore, the two aspects must be properly considered to select a suitable value. It is assumed herein that the center frequency position is set to a value (i.e., 175 kHz) corresponding to sixteen (16) times the subcarrier spacing. In this case, as shown in FIG. 9A, the center frequency spacing between adjacent FAs is changed to 10.15 MHz rather than the conventional value 10 MHz, and thus, respective subcarriers of an FA1 and an FA2 can maintain orthogonality with each other.

Referring to FIG. 9B, the size of the frequency raster is maintained to be the conventional value 250 kHz, and a center frequency position of each FA is shifted left or right within a range that is half of the subcarrier spacing. In this case, as shown in FIG. 9B, the center frequency position of the FA1 may be shifted to fit a conventional frequency raster, and the center frequency position of the FA2 may be shifted left by $\Delta f (=3.125$ kHz$)$, so that respective subcarriers of the FA1 and the FA2 can maintain orthogonality with each other. In contrast, the MS, which performs the initial frequency synchronization acquisition process, performs a preamble search process at a position corresponding to an integer multiple of the frequency raster. The MS operates by compensating for an offset value which is intentionally shifted by a BS in a frequency offset compensation process.

Although a method of using a subcarrier included in a guard band to transmit data in a system of the present invention supporting frequency overlay has been described above, irrespective of whether a frequency overlay operation is performed or not, a method of using additional subcarriers included in the guard band to transmit data may also be used in the present invention even if a center frequency spacing from an adjacent FA is an integer multiple of a subcarrier spacing.

According to exemplary embodiments of the present invention, a center frequency spacing between FAs is set to an integer multiple of a subcarrier spacing in a communication system supporting frequency overlay. Therefore, a guard band located between two FAs can be utilized as a data subcarrier for data transmission, thereby increasing spectral efficiency.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating a Mobile Station (MS) for using a guard band as a subcarrier for signal transmission in a communication system supporting frequency overlay, the method comprising:
    searching for a first center frequency for a first Frequency Assignment (FA), the first center frequency located at a position corresponding to an integer multiple of a subcarrier spacing;
    after searching for the first center frequency, receiving information indicating the numbers $n_1$ and $n_2$ of first additional subcarriers;
    performing a first network entry process by using all subcarriers including the first additional subcarriers, wherein the first additional subcarriers are subcarriers for data transmission within the guard band,
    wherein a spacing between the first center frequency for the first FA and a second center frequency for a second FA adjacent to the first FA is an integer multiple of the subcarrier spacing;
    receiving information indicating the numbers $n_3$ and $n_4$ of second additional subcarriers; and
    performing a second network entry process by using all subcarriers including the second additional subcarriers.

2. The method of claim 1, further comprising:
    during the first network entry process, searching for the second center frequency located at a position corresponding to an integer multiple of the subcarrier spacing in a frequency overlay mode, wherein receiving the information indicating the numbers $n_3$ and $n_4$ of the second additional subcarriers occurs after searching for the second center frequency.

3. The method of claim 2, wherein, in the searching for the center frequency, a preamble is searched for within a determined range from a position corresponding to an N-integer multiple of the subcarrier spacing, and if the preamble is not found within the determined range, the preamble is re-searched for by increasing a Fast Fourier Transform (FFT) size.

4. The method of claim 2, wherein the numbers $n_1$ and $n_2$ of the additional subcarriers are equal to or different from each other.

5. The method of claim 2, wherein, if a subchannel is configured in a resource block unit, information indicating the number of additional subcarriers is generated based on the resource block unit.

6. A method of operating a Base Station (BS) for using a guard band as a subcarrier for signal transmission in a communication system supporting frequency overlay, the method comprising:
broadcasting information indicating the numbers $n_1$ and $n_2$ of first additional subcarriers according to a first center frequency for a first Frequency Assignment (FA), the first center frequency located at a position corresponding to an integer multiple of a subcarrier spacing;
performing a first network entry process with a corresponding Mobile Station (MS) by using all subcarriers including the first additional subcarriers;
after the first network entry process, broadcasting information indicating the numbers $n_3$ and $n_4$ of second additional subcarriers according to a second center frequency for a second FA adjacent to the first FA, the second center frequency located at a position corresponding to an integer multiple of the subcarrier spacing in a frequency overlay mode; and
performing a second network entry process with the corresponding MS by using all subcarriers including the second additional subcarriers, wherein the first and second additional subcarriers are subcarriers for data transmission within the guard band,
wherein a spacing between the first center frequency and the second center frequency is an integer multiple of the subcarrier spacing.

7. The method of claim 6, wherein, in the searching for the first and second center frequencies, a preamble is searched for within a determined range from a position corresponding to an N-integer multiple of the subcarrier spacing, and if the preamble is not found within the determined range, the preamble is re-searched for by increasing a Fast Fourier Transform (FFT) size.

8. The method of claim 6, wherein the numbers $n_1$ and $n_2$ of the additional subcarriers of the first additional subcarriers are equal to or different from the numbers $n_3$ and $n_4$ of the additional subcarriers of the second additional subcarriers.

9. The method of claim 6, wherein, if a subchannel is configured in a resource block unit, information indicating the number of additional subcarriers is generated based on the resource block unit.

10. An apparatus for using a guard band as a subcarrier for signal transmission in a communication system supporting frequency overlay, the apparatus comprising:
a first Media Access Control (MAC) processor configured to;
search for a first center frequency for a first Frequency Assignment (FA), the first center frequency located at a position corresponding to an integer multiple of a subcarrier spacing, and
receive information indicating the numbers $n_1$ and $n_2$ of first additional subcarriers after searching for the first center frequency;
a second Media Access Control (MAC) processor configured to:
receive information indicating the numbers $n_3$ and $n_4$ of second additional subcarriers; and
a controller configured to;
perform a first network entry process by using all subcarriers including the first additional subcarriers, wherein the first additional subcarriers are subcarriers for data transmission within the guard band, and
perform a second network entry process by using all subcarriers including the second additional subcarriers,
wherein a spacing between the first center frequency for the first FA and the second center frequency for the second FA adjacent to the first FA is an integer multiple of the subcarrier spacing.

11. The apparatus of claim 10, wherein the second MAC process is configured to search for the second center frequency located at a position corresponding to an integer multiple of the subcarrier spacing in a frequency overlay mode during the first network entry process, wherein the second MAC process is configured to receive the information indicating the numbers $n_3$ and $n_4$ of the second additional subcarriers after searching for the second center frequency.

12. The apparatus of claim 11, wherein the MAC processor is configured to search for a preamble within a determined range from a position corresponding to an N-integer multiple of the subcarrier spacing, and if the preamble is not found within the determined range, re-search for the preamble by increasing a Fast Fourier Transform (FFT) size.

13. The apparatus of claim 11, wherein the numbers $n_1$ and $n_2$ of the additional subcarriers of the first additional subcarriers are equal to or different from the numbers $n_3$ and $n_4$ of the additional subcarriers of the second additional subcarriers.

14. The apparatus of claim 11, wherein, if a subchannel is configured in a resource block unit, information indicating the number of additional subcarriers is generated based on the resource block unit.

15. An apparatus for using a guard band as a subcarrier for signal transmission in a communication system supporting frequency overlay, the apparatus comprising:
a Media Access Control (MAC) processor configured to;
broadcast information indicating the numbers $n_1$ and $n_2$ of first additional subcarriers according to a first center frequency for a first Frequency Assignment (FA), the first center frequency located at a position corresponding to an integer multiple of a subcarrier spacing;
a second MAC processor configured to:
broadcast information indicating the numbers $n_3$ and $n_4$ of second additional subcarriers according to a second center frequency for a second FA, the second center frequency located at a position corresponding to an integer multiple of the subcarrier spacing in a frequency overlay mode; and
a controller configured to;
perform a first network entry process with a corresponding Mobile Station (MS) by using all subcarriers including the first additional subcarriers, wherein the first additional subcarriers are subcarriers for data transmission within the guard band, and
perform a second network entry process with the corresponding MS by using all subcarriers including the first additional subcarriers and the second additional subcarriers, wherein the second additional subcarriers are subcarriers for data transmission within the guard band,
wherein a spacing between the first center frequency for the first FA and the second center frequency for the second FA adjacent to the first FA is an integer multiple of the subcarrier spacing.

16. The apparatus of claim 15, wherein the MAC processor is configured to search for a preamble within a determined range from a position corresponding to an N-integer multiple of the subcarrier spacing, and if the preamble is not found within the determined range, re-search for the preamble by increasing a Fast Fourier Transform (FFT) size.

17. The apparatus of claim 15, wherein the numbers $n_1$ and $n_2$ of the additional subcarriers are equal to or different from each other.

18. The apparatus of claim 15, wherein, if a subchannel is configured in a resource block unit, information indicating the number of additional subcarriers is generated based on the resource block unit.

19. A method of operating a Mobile Station (MS) for using a guard band as a subcarrier for signal transmission in a communication system supporting frequency overlay, the method comprising:
    searching for a first center frequency for a first Frequency Assignment (FA) by compensating for the first center frequency shifted to be an integer multiple of a subcarrier spacing;
    after searching for the first center frequency, receiving information indicating the numbers $n_1$ and $n_2$ of first additional subcarriers in a resource block unit;
    performing a first network entry process by using all subcarriers within a frequency allocation including the first additional subcarriers,
    wherein a total sum $(n_1+n_2)$ of the first additional subcarriers is an integer multiple of a resource block size, wherein the first additional subcarriers are subcarriers for data transmission within the guard band;
    receiving information indicating the numbers $n_3$ and $n_4$ of second additional subcarriers in a resource block unit; and
    performing a second network entry process by using all subcarriers including the second additional subcarriers, wherein the second additional subcarriers are subcarriers for data transmission within the guard band,
    wherein a spacing between the first center frequency for the first FA and a second center frequency for a second FA adjacent to the first FA is an integer multiple of the subcarrier spacing.

20. The method of claim 19, further comprising:
    during the first network entry process, searching for the second center frequency by compensating for the second center frequency shifted to be an integer multiple of the subcarrier spacing in a frequency overlay mode, wherein receiving the information indicating the numbers $n_3$ and $n_4$ of the second additional subcarriers occurs after searching for the second center frequency.

21. The method of claim 20, wherein, among the resource blocks, a specific resource block comprises additional subcarriers of a guard band and some subcarriers of an available band excluding the guard band.

22. The method of claim 19, wherein, among the resource blocks, a specific resource block comprises additional subcarriers of a guard band and some subcarriers of an available band excluding the guard band.

23. A method of operating a Base Station (BS) for using a guard band as a subcarrier for signal transmission in a communication system supporting frequency overlay, the method comprising:
    shifting a first center frequency for a first Frequency Assignment (FA), the first center frequency shifted to be equal to an integer multiple of a subcarrier spacing;
    broadcasting information regarding first additional subcarriers according to the shifted first center frequency; and
    performing a first network entry process with a corresponding Mobile Station (MS) by using all subcarriers including the first additional subcarriers, wherein the first additional subcarriers are subcarriers for data transmission within the guard band;
    after the first network entry process, shifting a second center frequency for a second FA, the second center frequency to be equal to an integer multiple of the subcarrier spacing in a frequency overlay mode;
    broadcasting information regarding second additional subcarriers in a resource block unit according to the shifted second center frequency; and
    performing a second network entry process with the corresponding MS by using all subcarriers including the second additional subcarriers, wherein the second additional subcarriers are subcarriers for data transmission within the guard band,
    wherein a spacing between the first center frequency for the first FA and the second center frequency for the second FA adjacent to the first FA is an integer multiple of the subcarrier spacing.

24. The method of claim 23, wherein, among the resource blocks, a specific resource block comprises additional subcarriers of a guard band and some subcarriers of an available band excluding the guard band.

25. The method of claim 23, wherein, among the resource blocks, a specific resource block comprises additional subcarriers of a guard band and some subcarriers of an available band excluding the guard band.

26. An apparatus for using a guard band as a subcarrier for signal transmission in a communication system supporting frequency overlay, the apparatus comprising:
    a first Media Access Control (MAC) processor configured to search for a first center frequency for a first Frequency Assignment (FA) by compensating for the first center frequency shifted to be an integer multiple of a subcarrier spacing, and receive information indicating the numbers $n_1$ and $n_2$ of first additional subcarriers in a resource block unit after searching for the first frequency;
    a second Media Access Control (MAC) processor configured to:
        receive information indicating the numbers $n_3$ and $n_4$ of second additional subcarriers in a resource block unit; and
    a controller configured to;
        perform the first network entry process by using all subcarriers including the first additional subcarriers, and
        perform a second network entry process by using all subcarriers including the second additional subcarriers, wherein a total sum $(n_1+n_2)$ of the first additional subcarriers is an integer multiple of a resource block size, wherein the first additional subcarriers are subcarriers for data transmission within the guard band,
    wherein a spacing between the first center frequency for the first FA and a second center frequency for a second FA adjacent to the first FA is an integer multiple of the subcarrier spacing.

27. The apparatus of claim 26, wherein the second MAC processor is configured to search for the second center frequency by compensating for the second center frequency shifted to be an integer multiple of the subcarrier spacing in a frequency overlay mode during the first network entry process, wherein the second MAC processor is configured to receive the information indicating the numbers $n_3$ and $n_4$ of the second additional subcarriers after searching for the second center frequency.

28. The apparatus of claim 27, wherein, among the resource blocks, a specific resource block comprises additional subcarriers of a guard band and some subcarriers of an available band excluding the guard band.

29. The apparatus of claim 26, wherein, among the resource blocks, a specific resource block comprises additional subcarriers of a guard band and some subcarriers of an available band excluding the guard band.

30. An apparatus for using a guard band as a subcarrier for signal transmission in a communication system supporting frequency overlay, the apparatus comprising:
  a first Media Access Control (MAC) processor configured to shift a first center frequency for a first Frequency Assignment (FA), the first center frequency shifted to be equal to an integer multiple of a subcarrier spacing and configured to broadcast information regarding first additional subcarriers according to the shifted first center frequency;
  a second MAC processor configured to broadcast information regarding second additional subcarriers in a resource block unit; and
  a controller configured to;
    perform the first network entry process with a corresponding Mobile Station (MS) by using all subcarriers including the first additional subcarriers, wherein the first additional subcarriers are subcarriers for data transmission within the guard band, and
    perform a second network entry process with the corresponding MS by using all subcarriers including the second additional subcarriers, wherein the second subcarriers are subcarriers for data transmission within the guard band,
  wherein a spacing between the first center frequency for the first FA and the second center frequency for the second FA adjacent to the first FA is an integer multiple of the subcarrier spacing.

31. The apparatus of claim 30, wherein the second MAC processor is configured to shift the second center frequency to be equal to an integer multiple of the subcarrier spacing in a frequency overlay mode after the first network entry process and configured to broadcast information regarding second additional subcarriers in a resource block unit according to the shifted second center frequency.

32. The apparatus of claim 31, wherein, among the resource blocks, a specific resource block comprises additional subcarriers of a guard band and some subcarriers of an available band excluding the guard band.

33. The apparatus of claim 30, wherein, among the resource blocks, a specific resource block comprises additional subcarriers of a guard band and some subcarriers of an available band excluding the guard band.

34. A method of using a guard band as a subcarrier for signal transmission in a communication system supporting frequency overlay, the method comprising:
  performing a first network entry process by searching for a first center frequency for a first Frequency Assignment (FA), the first center frequency located in a position corresponding to an integer multiple of a subcarrier spacing in a frequency overlay mode;
  after the first network entry process, performing a second network entry process by searching for a second center frequency for a second FA adjacent to the first FA, the second center frequency located at a position corresponding to an integer multiple of the subcarrier spacing; and
  broadcasting information indicating the numbers $n_1$ and $n_2$ of first additional subcarriers for the first network entry process, and indicating the numbers $n_3$ and $n_4$ of second additional subcarriers for the second network entry process, for data transmission within the guard band between the first center frequency and the second center frequency,
  wherein a spacing between the first center frequency for the first FA and the second center frequency is an integer multiple of the subcarrier spacing.

35. The method of claim 34, wherein, if a subchannel is configured in a resource block unit, information indicating the number of additional subcarriers is generated based on the resource block unit.

* * * * *